US008533023B2

(12) United States Patent
Braun et al.

(10) Patent No.: US 8,533,023 B2
(45) Date of Patent: Sep. 10, 2013

(54) SYSTEMS, METHODS AND COMPUTER PROGRAM PRODUCTS FOR COMPACT SCHEDULING

(75) Inventors: Heinrich K. Braun, Karlsruhe (DE); Thomas H. Engelmann, Walldorf (DE); Martin D. Hentschel, Nusslochl (DE)

(73) Assignee: SAP AG, Walldorf (DE)

( * ) Notice: Subject to any disclaimer, the term of this patent is extended or adjusted under 35 U.S.C. 154(b) by 2146 days.

(21) Appl. No.: 11/319,374

(22) Filed: Dec. 29, 2005

(65) Prior Publication Data
US 2006/0143063 A1 Jun. 29, 2006

(30) Foreign Application Priority Data

Dec. 29, 2004 (EP) .................................... 04078566

(51) Int. Cl.
*G06Q 10/00* (2006.01)
(52) U.S. Cl.
USPC ........................................ 705/7.24; 705/7.22
(58) Field of Classification Search
None
See application file for complete search history.

(56) References Cited

U.S. PATENT DOCUMENTS

| | | | | |
|---|---|---|---|---|
| 5,040,123 | A * | 8/1991 | Barber et al. | 700/100 |
| 5,233,533 | A * | 8/1993 | Edstrom et al. | 700/103 |
| 5,596,502 | A * | 1/1997 | Koski et al. | 700/95 |
| 5,826,080 | A * | 10/1998 | Dworzecki | 718/103 |
| 5,953,707 | A * | 9/1999 | Huang et al. | 705/7.25 |
| 5,974,395 | A * | 10/1999 | Bellini et al. | 705/7.31 |
| 6,151,582 | A * | 11/2000 | Huang et al. | 705/7.25 |
| 6,167,320 | A * | 12/2000 | Powell | 700/95 |
| 6,243,613 | B1 * | 6/2001 | Desiraju et al. | 700/104 |
| 6,415,196 | B1 * | 7/2002 | Crampton et al. | 700/100 |
| 6,801,820 | B1 * | 10/2004 | Lilly et al. | 700/100 |
| 6,885,902 | B2 * | 4/2005 | Crampton et al. | 700/99 |
| 6,898,472 | B2 * | 5/2005 | Crampton et al. | 700/97 |
| 6,907,305 | B2 * | 6/2005 | Mata et al. | 700/99 |
| 7,039,595 | B1 * | 5/2006 | Lilly et al. | 705/7.25 |
| 7,151,973 | B1 * | 12/2006 | Moll | 700/100 |
| 7,440,907 | B2 * | 10/2008 | Lilly et al. | 705/7.16 |
| 7,463,939 | B1 * | 12/2008 | Mata et al. | 700/100 |
| 7,519,444 | B2 * | 4/2009 | Lilly et al. | 700/100 |
| 7,539,630 | B2 * | 5/2009 | Crampton et al. | 705/26.1 |
| 7,805,326 | B2 * | 9/2010 | Scheuer | 705/8 |

(Continued)

OTHER PUBLICATIONS

Jobops job management software. Enhanced scheduling. 2006. Synergistic software solutions. 1-2.*

(Continued)

*Primary Examiner* — Brett Feeney
(74) *Attorney, Agent, or Firm* — Finnegan, Henderson, Farabow, Garrett & Dunner, LLP

(57) ABSTRACT

Methods, systems and computer program products are provided for allocating resources in a plannable process, wherein a number of resources is used for executing an order comprising a chain of related activities to be executed on the number of resources. In one implementation, a method comprises, for each order, identifying a first activity execution due date for executing a predetermined first activity in the order, scheduling an execution date for each activity according to a just-in-time criterion in correspondence with an activity execution due date of a related activity, identifying a second activity execution date for executing a predetermined second activity in the order that is scheduled according to the scheduling routine, and reversely scheduling an execution date for each activity according to a just-in-time criterion in correspondence with an activity execution due date of a reverse related activity, wherein the second activity execution date is kept fixed as a second activity execution due date.

21 Claims, 9 Drawing Sheets

(56) References Cited

U.S. PATENT DOCUMENTS

| | | | |
|---|---|---|---|
| 2002/0087227 A1* | 7/2002 | Tozawa et al. | 700/95 |
| 2002/0198616 A1* | 12/2002 | Crampton et al. | 700/99 |
| 2003/0126023 A1* | 7/2003 | Crampton et al. | 705/22 |
| 2003/0126024 A1* | 7/2003 | Crampton et al. | 705/22 |
| 2003/0149608 A1* | 8/2003 | Kall et al. | 705/8 |
| 2003/0149631 A1* | 8/2003 | Crampton et al. | 705/22 |
| 2003/0177050 A1* | 9/2003 | Crampton et al. | 705/8 |
| 2003/0200130 A1* | 10/2003 | Kall et al. | 705/8 |
| 2003/0208392 A1* | 11/2003 | Shekar et al. | 705/8 |
| 2005/0114829 A1* | 5/2005 | Robin et al. | 717/101 |

OTHER PUBLICATIONS

Erickson DR and Steadman AT (1995). Metric Tools: Effort and Schedule. STSC. Mar. 1-14.*

Klein R. Bidirectional planning: improving priority rule-based heuristics for scheduling resource-constrained projects. European Journal of Operational Research. vol. 127, Issue 3, Dec. 16, 2000, pp. 619-638.*

Palmer GJ (1995). Journal of Intelligent Manufacturing. vol. 7, No. 3, 163-176.*

Pezzella F and Merelli E (2000). A tabu search method guided by shifting bottleneck for the job shop scheduling problem. European Journal of Operational Research. vol. 120, Issue 2, Jan. 16, 2000, pp. 297-310.*

Liaw CF (1999). Applying simulated annealing to the open shop scheduling problem. IIE Transactions. vol. 31, No. 5, 457-465.*

Valls V, Quintanilla S and Ballestin F (2003). Resource-constrained project scheduling: A critical activity reordering heuristic. European Journal of Operational Research vol. 149, Issue 2, Sep. 1, 2003, pp. 282-301.*

Brizuela CA and Sannomiya N. From the Classical Job Shop to a Real Problem: A Genetic Algorithm Approach. Proceedings of the 39" IEEE Conference on Decision and Control. Sydney, Australia Dec. 2000. 4174-4183.*

* cited by examiner

SYSTEMS, METHODS AND COMPUTER PROGRAM PRODUCTS FOR COMPACT SCHEDULING

TECHNICAL FIELD

The present invention generally relates to systems, methods and computer program products for allocating resources in a plannable process. More particularly, the invention relates to systems and methods for allocating resources, wherein a predetermined number of resources is used for executing an order comprising a chain of related activities to be executed on the predetermined number of resources.

BACKGROUND INFORMATION

Conventional machine scheduling problems are solved by creating orders that are scheduled to create a feasible machine schedule which fulfills certain hard or predefined constraints. Additionally, some optimization criteria can be defined which will affect the outcome of the machine schedule, such as a goal to minimize setup times or to prefer certain resources for production or to meet due dates or times.

Beside these existing optimization criteria, customers often demand a strategy to reduce order lead time, which may be defined as the time span between a start time of an earliest activity in an order and a finish time of a last activity in that order. This is particularly true for customers in certain industries, such as the semi-conductor industry.

SUMMARY OF THE INVENTION

An object of the present invention is to provide scheduling systems, methods and computer program products, wherein order lead times can be reduced. Another object of the present invention is to benefit optimally from existing scheduling routines and provide an additional optimization without the necessity to introduce fundamental changes to the conventional scheduling routines.

Consistent with an embodiment of the present invention, a method is provided for allocating resources in a plannable process, wherein a predetermined number of resources is used for executing an order comprising a chain of related activities to be executed on the predetermined number of resources. The method includes scheduling for each activity an execution date according to a just-in-time criterion in correspondence with an activity execution due date of a related activity. Further, the method includes: identifying a first activity execution due date for executing a predetermined first activity in the order, identifying a second activity execution date for executing a predetermined second activity in the order that is scheduled according to a scheduling routine, and reversely scheduling an execution date for each activity according to a just-in-time criterion in correspondence with an activity execution due date of a reverse related activity, wherein the second activity execution date is kept fixed as a second activity execution due date.

In the above-described method, the first activity execution due date may correspond to an order start date and the second activity execution date may correspond to an order finish date. However, the converse may be also possible, in that the first activity execution due date is an order finish date and the second activity execution date is an order start date. Depending on the case, the first activity execution due date may be an order start due date and the second activity execution date may be an earliest order finish date. Conversely, the first activity execution due date may be a latest order start date and the second activity execution date may be an order finish due date. Alternatively, the first and second activities may be a selected first, not necessarily earliest activity and a second activity not necessarily last activity defining a time window between intermediate activities in an order.

Methods consistent with the present invention may be used to reduce order lead times. Also, compactly scheduled orders can lead to reduced storage costs and waiting times from an economical point of view, leading to an increased customer satisfaction.

In accordance with one embodiment of the invention, a scheduling method may be provided to compact an order and schedule the compacted order as soon as possible. In accordance with another embodiment, the method may be adapted to compact an order and schedule the order as late as possible.

Another embodiment of the present invention relates to a method of allocating resources in a plannable process, wherein a predetermined number of resources is used for executing an order. The method comprises identifying a first activity and a second activity of the order, providing a predecessor/successor relation between the first activity and the second activity, and providing a predefined scheduling constraint to the predecessor/successor relation. Further, the method includes running a scheduling program for scheduling the activities in the order, the scheduling program comprising a genetic scheduling algorithm that is evaluated in accordance with the predefined scheduling constraint to schedule the first and second activity in accordance with the scheduling constraint to the predecessor/successor relation.

Generally, two activities may be related in a predecessor/successor relation when no in between activities are present. However, in some contexts, a predetermined number of activities or a predetermined time span between subsequent activities may be present.

Consistent with an embodiment of the present invention, the genetic algorithm used in the above-described method may be any known or conventional algorithm that iteratively repeats proposed scheduling solutions that vary slightly from each other in scheduled execution times of a number of activities in order. By repeated variations of a solution, a best solution or optimal solution can be produced.

U.S. Pat. No. 5,233,533 proposes a subsequent number of backward and forward scheduling actions. In this patent, however, these two principles are used to meet a given due date and create a feasible schedule. In particular, the patent does not suggest to keep, starting from a first date, after a first scheduling process, a scheduled execution date of a second date of the order fixed in order to perform a second, reverse scheduling process.

As used herein, where the term "date" is used, is to be understood that this term is used, unless the alternative is clear from the context, in a generic sense as pointing a relevant event in time in a certain progressing time scale. Furthermore, where the term "time" or "time span" is used, unless the alternative is clear from the context, a generic time difference is indicated between two "dates".

Embodiments and aspects of the invention will be further clarified with reference to the drawings.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE EMBODIMENTS

Figure 1:
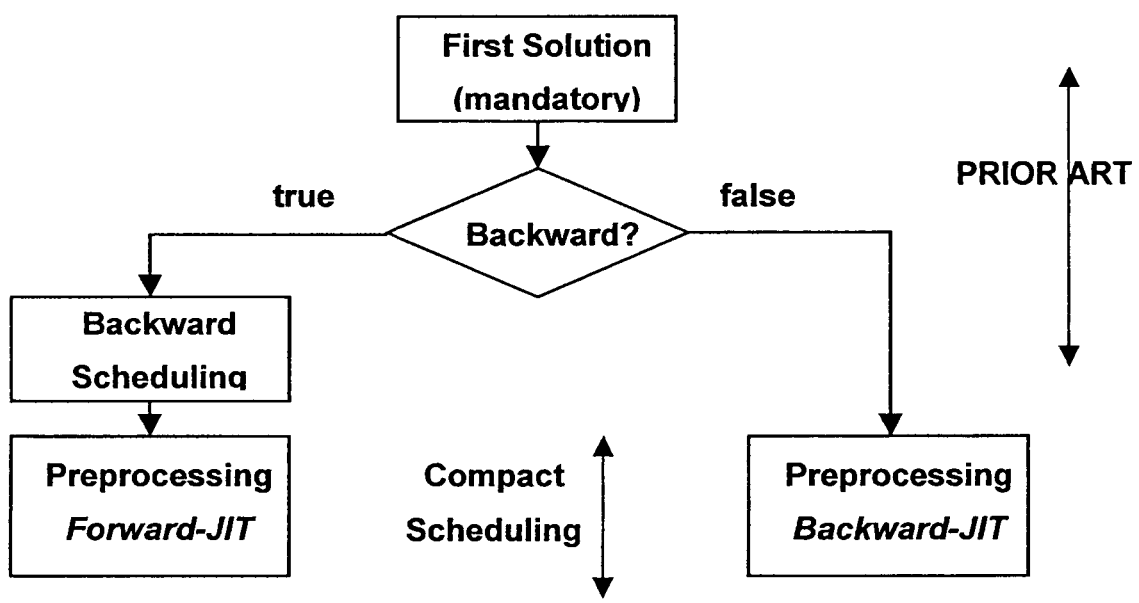
FIG. 1 is a schematic illustration of an exemplary scheduling method for forward and backward scheduling, consistent with an embodiment of the present invention.

FIG. 1 illustrates a correspondence between a resource allocation method according to an embodiment of the present invention and conventional allocation methods.

In a plannable process, conventionally, when a certain predetermined number of resources are used for executing an order, a chain of related activities are forward scheduled to provide a "first solution." This solution is a feasible solution in that it considers activity process times and time buffers between subsequent activities required for handling, etc. Furthermore, this solution provides an execution order wherein subsequent activities of an order are scheduled as soon as possible. Since certain activities may correspond to resources that are not timely available, as will be apparent from FIG. 3, an the order lead time increase may lead to an increase in handling costs and unwanted delay in production processes where a timely follow up of subsequent activities is mandatory.

As illustrated in the flow chart of FIG. 1, conventional scheduling methods alternatively provide a "back schedule" option, which means that an order is scheduled close to an order due time, which may be further ahead than the earliest finish time of an order. This "back schedule" option, also known as "backwards optimizing", provides in one aspect a feasible schedule where activities are scheduled close to the order due time. Again, this may lead to inefficiencies in the allocation of resources, since some resources are unavailable which may cause increase in lead times. In this aspect, back scheduling, provided that the order due time is feasible (that is, the order due time is further away in future than the earliest order finish time), shows a time-reversed symmetry to the earlier discussed conventional "first solution" scheduling method.

Although the back scheduling method may be started without scheduling a "first solution," this may lead to scheduling an earliest start date of an order that is unfeasible since it is scheduled in the past. Therefore, usually the back scheduling option is executed after the "first solution" scheduling process, wherein a non-optimal, but feasible solution is scheduled.

As stated earlier both methods have a disadvantage in that the lead times between subsequent activities may be increased, which can give rise to process problems or even production loss. One object of the present invention is that the subsequent activities in an order are kept as short as possible in addition to the forward or backward scheduling solution options as discussed below. Accordingly in both options, that is, in the first solution schedule routine without back scheduling (right branch of the flow chart in FIG. 1) or the first solution schedule routine with back scheduling (left branch of the flow chart in FIG. 1), an additional step is performed, which in the figure is indicated as "forward JIT" (forward Just-in-ime), or "backward JIT" (backward Just-in-Time), depending on whether a backward scheduling optimization was present or not. In short, both forward and backward JIT options envisage to reschedule in reverse the activities that were scheduled in a forward or backward (in the case of backward scheduling) manner, while keeping an ultimate scheduled date of an order (thus an earliest finish or a latest start, depending on forward or backward scheduling) fixed. In reverse scheduling, all activities are scheduled "just in time" to this ultimate scheduled date, which results in a compact schedule with minimum lead times.

Figure 2:
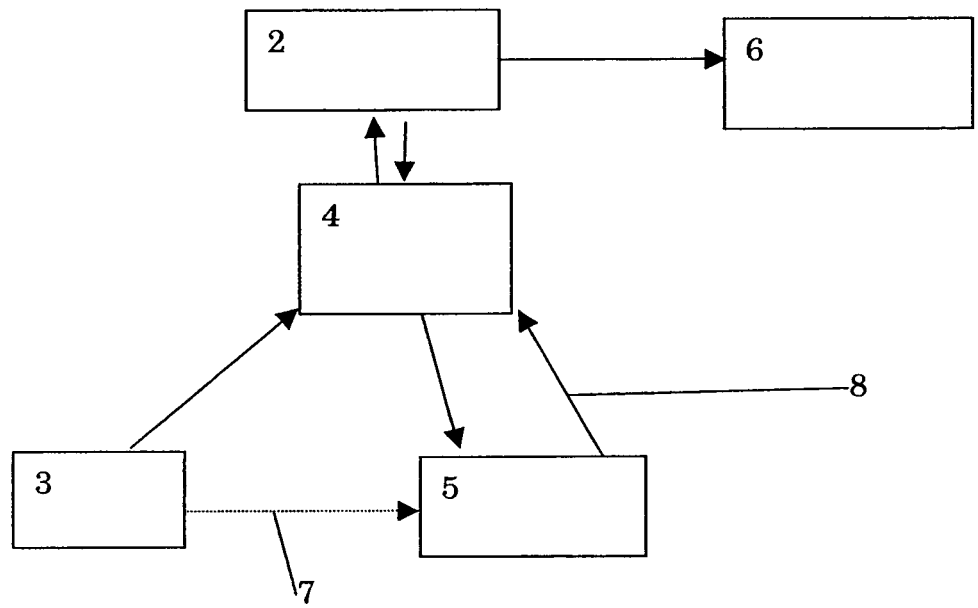
FIG. 2 is a schematic illustration of an exemplary system, consistent with an embodiment of the present invention.

In accordance with an embodiment of the present invention there is provided, as shown in FIG. 2 an exemplary system 1 for allocating resources in a plannable process. The system 1 comprises a module 2 for representing a predetermined number of resources to be used for executing an order comprising a chain of related activities to be executed on the predetermined number of resources. The system 1 further comprises an input module 3 for identifying a first activity execution due date for executing a predetermined first activity in the order, and a scheduling module 4 for scheduling an execution date for each activity according to a just-in-time criterion in correspondence with an activity execution due date of a related activity. The system 1 also comprises an identification module 5 for identifying a second activity execution date from the scheduling module 4 for executing a predetermined second activity in the order. The identification module 5 may be adapted to submit the identified second activity execution date to the scheduling module 4, and the scheduling module 4 may be adapted to schedule in reverse an execution date for each activity according to a just-in-time criterion in correspondence with an activity execution due date of a reverse related activity, wherein the second activity execution date is kept fixed as identified by the identification module 5. An output module 6 may also be provided in system 1 for outputting a scheduled order to a user interface (not shown).

As may be apparent from FIG. 2, unlike the conventional back scheduling method, where a predetermined due date is inputted from the input module 3 to the identification module 5 (schematically illustrated by dotted lines 7) in order to start a reverse scheduling, according to an embodiment of the present invention, the due date is calculated from the scheduling module 4 and inputted into the scheduling module 4 by the identification module 5 as illustrated by signal line 8.

Figure 3:
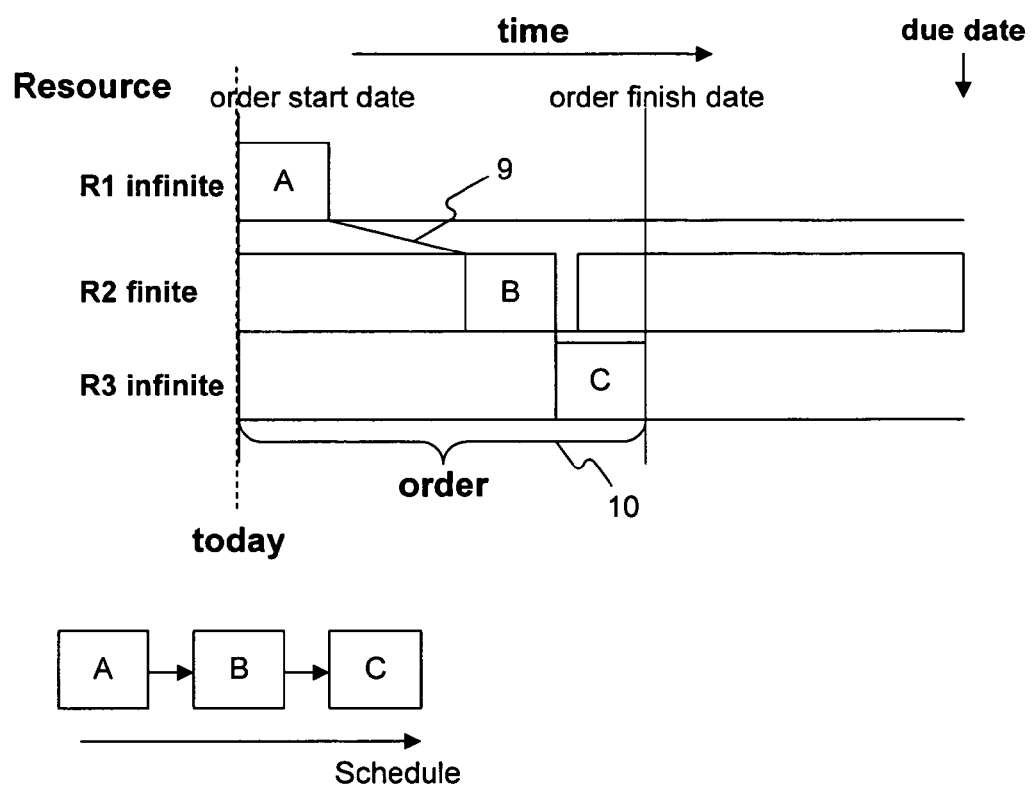
FIG. 3 is an illustration of a conventional forward "first solution" scheduling routine.

FIG. 3 further illustrates a conventional "first solution" schedule. In the illustrated schedule, a predetermined number of resources R1, R2, R3 is used for executing an order (schematically indicated as A>B>C) comprising a chain of related activities (A, B, C) to be executed on the predetermined number of resources (R1, R2, R3). In the example, the R1 and R3 resources are "infinite" in that they are supposed to possess an "infinite" capacity to process activities. For example, R1 and R3 are production machines where delays are negligible so that an activity (A, C) is instantly executed when necessary. In contrast, in the illustrated example, the R2 resource is "finite", that is, that the resource is not instantly available due to a limited processing capacity. Such finite resources introduce a delay in process time, that is, after A is considered finished (right hand side on the time line of the box A), a wait time 9 is scheduled until resource R2 is available. Where in the illustrated process activities A, B, and C are supposed to be carried out in a fixed, unchangeable amount of time, depending on the activity, the wait time 9 is responsible for an unpredictable increase in lead time 10 of the order, that is, the elapsed time between the order start (generally the start of the first activity in the order), and the order finish (generally the finish of the last activity in the order). Such an increase in lead time can be very much undesired, for example, when a product that is processed by resource R1 deteriorates within a certain time span and a timely continuation of the process in R2 is required.

In the example, the process is finished by processing activity C on resource R3, so that the order finish date is indicated by the vertical line right subsequent to activity C and is an "earliest" finish date, in that the system is unable to produce a finished order sooner due to the delay introduced on resource R2. As is explained, the scheduling is performed "forwardly" in that of the order the earliest activities are scheduled first and subsequent activities are scheduled after a previous activity is scheduled.

Figure 4:
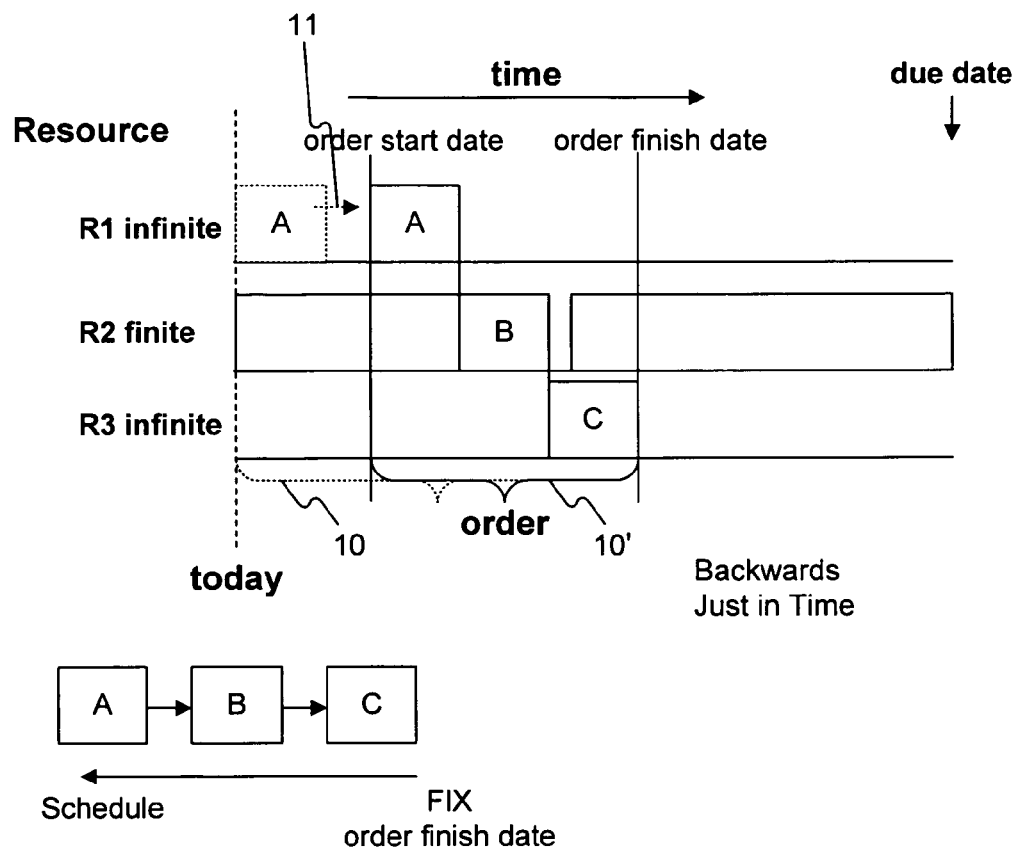
FIG. 4 is an exemplary scheduling method based on the "first solution" method illustrated in FIG. 3; consistent with an embodiment of the present invention.

FIG. 4 illustrates the addition of an extra scheduling step, continuing from the "first solution" schedule illustrated with reference to FIG. 3, consistent with an embodiment of the present invention. From the forward scheduling, wherein the activity execution date of the last activity C is identified, the scheduling routine is reversed, while the earliest finish date of the order is kept fixed. That is, activity C is scheduled fixed (as the outcome of the "first solution," activity C cannot be scheduled earlier but could be scheduled later, as will be illustrated in the back scheduling step in FIG. 5). Where activity C is kept fixed, the processing activities B and A are scheduled as late as possible, which amounts to a "just-in-time" schedule in order to process the fixed activity C. Thus, since R3 was infinite, activity B is not rescheduled but keeps it's previous scheduled execution date (a generalized indication of a process date, which may be a start or finish date or some other date indicative of the activity being processed). However, activity B, being processed on finite resource R2 gave rise to an increase of lead time. This increase can be cancelled by scheduling activity A "just-in-time" to the finite resource; that is, activity A is scheduled forward in time close to activity B as indicated by the previous schedule 10 (dotted lines) and the arrow 11 to the newly scheduled execution date of A.

As a result, the finish date of the order is kept fixed and the start date of the order is moved forward in time, hence resulting in a decrease of the order lead time. Thus, a more compact schedule is provided as illustrated by decreased lead time 10'.

Figure 5:
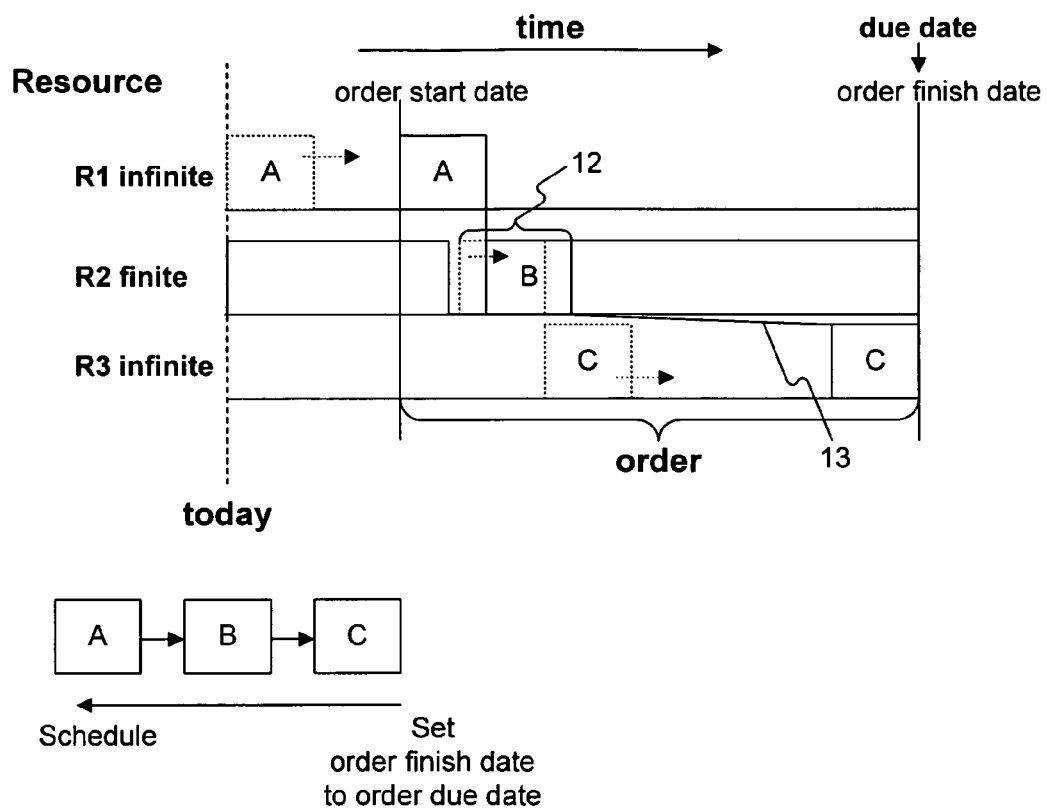
FIG. 5 is an illustration of a conventional backward scheduling method scheduling an order close to an order due date, based on the "first solution" method according to FIG. 3.

FIG. 5 shows a conventional back schedule optimization executed generally after the "first solution" step of FIG. 3. In this optimization step, the finish date of the order is not kept fixed but moved forward in time to an order due date. Hence, the order finish date, that is, the finish date of the last activity, is rescheduled to match an order due date. Then, previous subsequent activities B, C, are scheduled as late as possible. Since activity C is executed on an infinite resource R3, the executing thereof can be scheduled at any time, in particular, near the order due time. However, activity B is executed on a finite resource, which means that not all process times are available. Accordingly, an order lead time can be increased when the order is rescheduled to finish near an order due time. Thus, where activity C can be scheduled near the finish due time, activity B, due to the finite nature of resource R2, can only be moved forward a limited amount of time in time window 12, resulting in an increasing wait time 13 between the execution of activity B and C. Activity A, being executed on an infinite resource R1, can be scheduled close to the activity B and is movable forward in time without constraints, wherein an execution start date of activity A is identified as the latest order start date.

Therefore, although the conventional back scheduling optimization illustrated in FIG. 5 optimizes a scheduling of an order in that it schedules an order close to an order due time, the occurrence of undesired increases in wait times 13 is not prevented.

Figure 6:
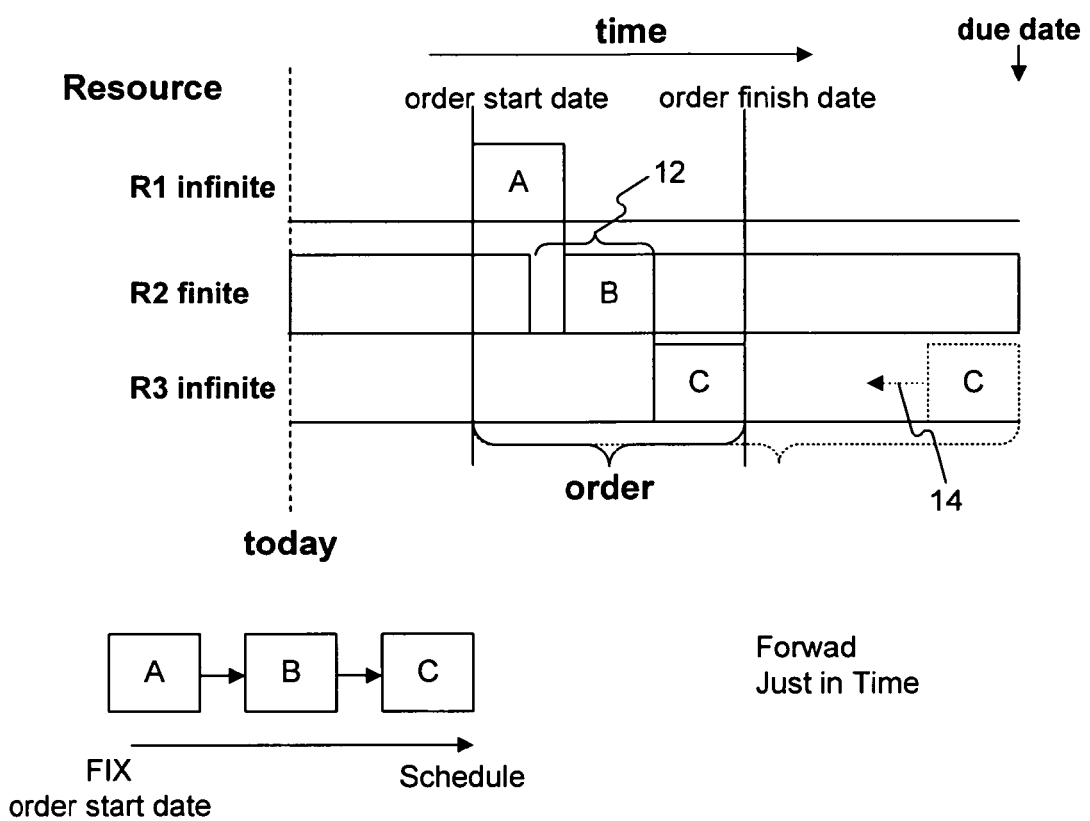
FIG. 6 is an exemplary method based on the backward scheduling method illustrated in FIG. 5; consistent with an embodiment of the present invention.

To overcome this problem, as is illustrated in FIG. 6, one embodiment of the present invention proposes for the back schedule option, after the execution of the back scheduling optimization as illustrated in FIG. 5, to execute a further optimization, wherein the order is compacted as much as possible, while trying to schedule the order as late as possible as illustrated before. Indeed, while the back scheduling optimization of FIG. 5 identifies a latest start execution date for starting the execution of the first order, this latest start date is, according to the compacting schedule, kept fixed and a forward just in time scheduling is executed. Thus, the execution of activity A is kept fixed, and the subsequent activities are scheduled as soon as possible thereafter to arrive at a feasible schedule. Subsequent activity B was scheduled just after activity A in the back schedule optimization, therefore, here the just-in-time criterion is already met and B is not rescheduled.

However, activity C was scheduled close to the due date, introducing the wait time 13. The compacting scheduling optimization reschedules C earlier in time as illustrated by arrow 14. The compacting scheduling optimization in the backward mode as illustrated in FIG. 6, thus arrives at a compacted schedule that is scheduled as late as possible, bounded by the constraints of the finite resources, in particular resource R2 which defines a time window 12 for activity B.

Figure 7:
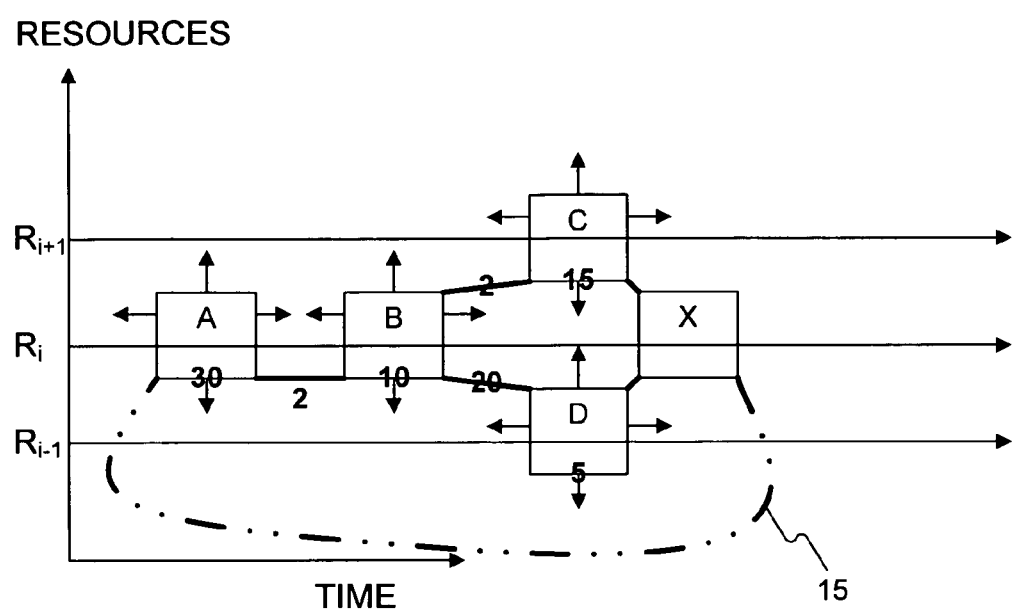
FIG. 7 is another exemplary scheduling method including adding a dummy activity, consistent with an embodiment of the present invention.

FIG. 7 shows an alternative compacting strategy, according to an embodiment of the present invention. In FIG. 7, a diagram is illustrated showing resources $R_i$ for some discrete i to be used for executing an order on the vertical axis, and some time progression (not necessarily linear or even for each resource) in a horizontal direction. Consequently, the diagram shows a scheduling diagram wherein the allocation of the resources is indicated and an order (A-D) is illustrated by connecting subsequent activities (A-D) of the order to be executed on the resources. The illustrated order is unique in that it branches after activity B and activities C and D are to be executed in a non-predetermined order. Conventionally, such an order is scheduled by providing a scheduling network of activities forming nodes in the scheduling network, and subsequent predecessor/successor relations are formed by links between the nodes. This network is held subject to a scheduling routine for scheduling the linked activities. To this end, a genetic scheduling algorithm generally iteratively repeats proposed scheduling solutions that vary slightly from each other in scheduled execution times of a number of activities in the order. By repeated variations of a solution, a best solution or optimal solution is produced. This is illustrated schematically by the single arrows that are placed in four directions on each activity. The genetic algorithm evaluates a modified schedule where the activity is slightly shifted in the resource-time diagram, wherein a quality criterion is evaluated to compare the modified solution to a previous solution. Generally, the quality criterion is evaluated to schedule certain subsequent activities to be executed within a predetermined maximum wait time.

According to an embodiment of the present invention, a further predecessor/successor relation is added to the scheduling network, wherein a pair of activities are linked that are non-subsequent.

To this end, for example, in the order A-D illustrated in FIG. 7, a further predecessor/successor relation 15 (illustrated by the dotted line) is provided between a first activity and a second activity. For example, the first and the last activity, and a predefined scheduling constraint is provided to the predecessor/successor relation. Then, conventionally, the genetic scheduling routine is run in accordance with the predefined scheduling constraint to schedule the first and second activity in accordance with the scheduling constraint. Hence, a feasible schedule is provided by the scheduling algorithm taking into account the scheduling constraint. If there is no schedule feasible, the program exits conventionally, for example, after running a predetermined number of retries or after a predetermined number of process time has elapsed. Thus, by setting the scheduling constraint between non-subsequent activities, the schedule is forcibly compacted to be executed within the constraint, thus arriving at a compact schedule as desired.

Figure 8:
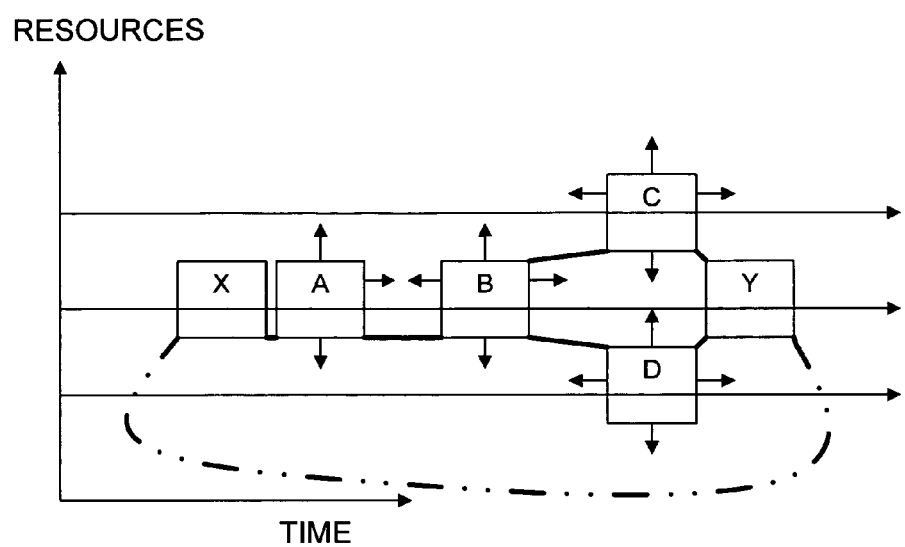
FIG. 8 is yet another exemplary scheduling method including adding a second dummy activity; consistent with an embodiment of the present invention.

Although in principle the constraint can be of a different nature, for example, defining a predetermined minimum time span between subsequent activities, preferably, the scheduling constraint is provided so that a time span between the first and second activity execution date is less than a predetermined maximum lead time value, so that the order is executed within the maximum lead time value. Furthermore as illustrated in FIG. 7, a dummy activity X (or, in FIG. 8, two activities X, Y) is related to an earliest and/or final activity to be executed in the order. Especially in the case of branched activities, where the time relationship between branches is indeterminate, this is convenient to define an absolute start and end of the order and to provide a predetermined format for the scheduling algorithm.

Furthermore, the predefined scheduling constraint is preferably selected in accordance with a minimum lead time value of the order to arrive at feasible compact schedules. As is illustrated schematically in FIG. 7, the minimum lead time is calculated as the maximum total time of minimum execution times and minimum wait times. In FIG. 7, the minimum execution time for activity A is 30 time units, and the wait time between activity A and B is 2 units, etc. It follows that the minimum lead time of the order is 67 units via branch A>B>D. In accordance with one embodiment, a heuristic formula to arrive at feasible scheduling propositions is the following formula:

$$\text{predetermined maximum lead time} = X*(\text{minimum lead time value}) + Y \text{ days}$$

where X and Y are a predetermined number (such as 2). Here, Y may serve as an offset that for instance (in number of days) reckons with the possibility of extending an order over a weekend.

Figure 9:
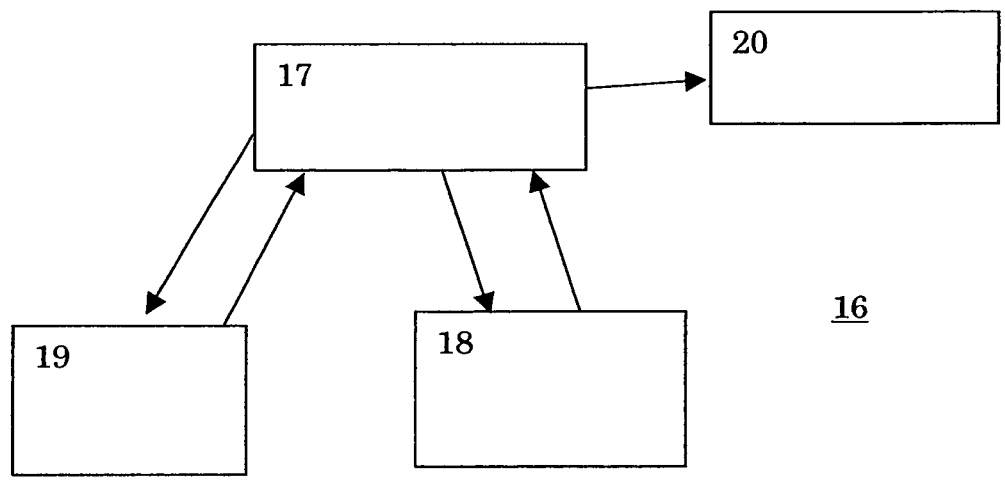
FIG. 9 is a schematic illustration of an alternative system consistent with an embodiment of the present invention.

To carry out methods consistent with embodiments of the invention, such as that described above with reference to FIGS. 6 and 7, a system 16 may be implemented as illustrated schematically in FIG. 9. System 16 may be provided for allocating resources in a plannable process. As shown in FIG. 9, the system 16 comprises a module 17 for representing a predetermined number of resources to be used for executing an order comprising a chain of related activities to be executed on the predetermined number of resources. The system 16 further comprises a scheduling module 18 for scheduling the activities in the order, the scheduling module comprising a genetic scheduling algorithm that is evaluated in accordance with a number of scheduling constraints provided to the scheduling module to schedule activities in accordance with the scheduling constraints. The system 16 may also include a module 19 for identifying a pair of activities of the order having a non-subsequent relation for providing a predecessor/successor relation between the pair of activities, and for providing a predefined scheduling constraint to the predecessor/successor relation to be scheduled by the scheduling module. Additionally, an output module 20 may be provided to output a scheduled order to a user interface (not shown).

The computational aspects described herein can be implemented in digital electronic circuitry, or in computer hardware, firmware, software, or in any combination thereof. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output.

Embodiments of the invention may also be implemented in an article of manufacture with a computer usable medium having computer readable instructions embodied therein for providing access to resources available on that computer, the computer readable instructions comprising instructions to cause the computer to perform any part or steps of methods according to the invention. Embodiments of the invention may also be implemented as a computer program for running on a computer system, at least including code portions for performing steps of methods according to the invention when run on a computer system or enabling a general propose computer system to perform functions of a filter device consistent with embodiments of the invention. Such a computer program may be provided on a data carrier, such as a CD-ROM or diskette, stored with data loadable in a memory of a computer system, the data representing the computer program. The data carrier may further include a data connection, such as a telephone cable or a wireless connection transmitting signals representing a computer program according to the invention.

It should be noted that the above-mentioned embodiments illustrate rather than limit the invention, and that those skilled in the art will be able to design alternatives without departing from the scope of the appended claims.

In the claims, any reference signs placed between parentheses shall not be construed as limiting the claim. The word 'comprising' does not exclude the presence of other elements or steps than those listed in a claim.

What is claimed is:
1. A method of allocating resources in a plannable process, a predetermined number of resources being used for executing an order comprising a chain of related activities to be executed on the predetermined number of resources, the method being executed by a processor and comprising:

scheduling an activity execution date for each activity of the related activities according to a just-in-time criterion in correspondence with an activity execution due date of a related activity;

identifying a first activity execution due date for executing a predetermined first activity in the order;

identifying a second activity execution date for executing a predetermined second activity in the order that is scheduled according to a scheduling routine;

selecting a predefined scheduling constraint defining a relation between the predetermined first activity and the predetermined second activity;

associating a dummy activity with at least one of the predetermined first activity and the predetermined second activity;

determining a minimum lead time based on a sum of (i) a minimum wait time associated with at least one of the predetermined first activity and the predetermined second activity and (ii) a minimum execution time associated with at least one of the predetermined first activity and the predetermined second activity;

determining a maximum lead time based on a sum of (i) a product of the dummy activity and the minimum lead time and (ii) an offset value; and reversely scheduling, by using the processor, the activity execution date for the each activity of the related activities according to the predefined scheduling constraint, the maximum lead time, and the just-in-time criterion in correspondence with an activity execution due date of a reverse related activity, wherein the second activity execution date is kept fixed.

2. A method according to claim 1, wherein the just-in-time criterion is evaluated in accordance with scheduling the activity execution date for the each activity of the related activities so that a time span between the scheduled activity execution date and a related activity execution due date is less than a predetermined minimum value.

3. A method according to claim 1, wherein the just-in-time criterion is evaluated in accordance with scheduling the activity execution date for the each activity of the related activities so that a time span between the scheduled activity execution date and a related activity execution due date is minimal.

4. A method according to claim 1, wherein scheduling is performed forward in time for related activities in succeeding order, and wherein reverse scheduling is performed backwards in time for related activities in preceding order.

5. A method according to claim 1, wherein the first activity execution due date is changed based on the just-in-time criterion.

6. A method according to claim 1, wherein the predetermined second activity is a succeeding activity and a succeeding activity execution date is scheduled according to a succeeding activity earliest start date in correspondence with a preceding activity start due date.

7. A method according to claim 1, wherein the first activity execution due date is an order start due date.

8. A method according to claim 7, wherein the second activity execution date is an earliest order finish date.

9. A method according to claim 1, wherein the first activity execution due date is an order finish due date.

10. A method according to claim 9, wherein the second activity execution date is a latest order start date.

11. A computer program product comprising a computer program stored on a non-transitory computer readable medium, the computer program comprising instructions, which when executed on a processor causes the processor to perform a method, the method comprising:

scheduling an activity execution date for each activity of the related activities according to a just-in-time criterion in correspondence with an activity execution due date of a related activity;

identifying a first activity execution due date for executing a predetermined first activity in the order;

identifying a second activity execution date for executing a predetermined second activity in the order that is scheduled according to a scheduling routine;

selecting a predefined scheduling constraint defining a relation between the predetermined first activity and the predetermined second activity;

associating a dummy activity with at least one of the predetermined first activity and the predetermined second activity;

determining a minimum lead time based on a sum of (i) a minimum wait time associated with at least one of the predetermined first activity and the predetermined second activity and (ii) a minimum execution time associated with at least one of the predetermined first activity and the predetermined second activity;

determining a maximum lead time based on a sum of (i) a product of the dummy activity and the minimum lead time and (ii) an offset value; and reversely scheduling, by using the processor, the activity execution date for the each activity of the related activities according to the predefined scheduling constraint, the maximum lead time, and the just-in-time criterion in correspondence with an activity execution due date of a reverse related activity, wherein the second activity execution date is kept fixed.

12. A system for allocating resources in a plannable process, the system comprising a module for representing a predetermined number of resources to be used for executing an order comprising a chain of related activities to be executed on the predetermined number of resources, the system further comprising:

an input device for identifying a first activity execution due date for executing a predetermined first activity in the order;

a scheduling module for scheduling an activity execution date for each activity of the related activities according to a just-in-time criterion in correspondence with an activity execution due date of a related activity;

a processor executing an identification module for:
identifying a second activity execution date from the scheduling module for executing a predetermined second activity in the order;

selecting a predefined scheduling constraint defining a relation between the predetermined first activity and the predetermined second activity;

associating a dummy activity with at least one of the first activity and second activity;

determining a minimum lead time based on a sum of (i) a minimum wait time associated with at least one of the predetermined first activity and the predetermined second activity and (ii) a minimum execution time associated with at least one of the predetermined first activity and the predetermined second activity;

determining a maximum lead time based on a sum of (i) a product of the dummy activity and the minimum lead time and (ii) an offset value; and submitting the identified second activity execution date to the scheduling module, and the scheduling module being adapted to schedule in reverse an execution date for the each activity of the related activities according to the predefined scheduling constraint, the maximum lead time, and the just-in-time criterion in correspondence with an activity execution due date of a reverse related activity, wherein the second activity execution date is kept fixed as identified by the identification module; and an output device for outputting a scheduled order to a user interface.

13. A system according to claim 12, wherein the just-in-time criterion is evaluated in accordance with scheduling the activity execution date for the each activity of the related activities so that a time span between the scheduled activity execution date and a related activity execution due date is less than a predetermined minimum value.

14. A system according to claim 12, wherein the just-in-time criterion is evaluated in accordance with scheduling the activity execution date for the each activity of the related activities so that a time span between the scheduled activity execution date and a related activity execution due date is minimal.

15. A system according to claim 12, wherein scheduling is performed forward in time for related activities in succeeding order.

16. A system according to claim 12, wherein the first activity execution due date is changed based on the just-in-time criterion.

17. A system according to claim 12, wherein the predetermined second activity is a succeeding activity and a succeeding activity execution date is scheduled according to a succeeding activity earliest start date in correspondence with a preceding activity start due date.

18. A system according to claim 12, wherein the first activity execution due date is an order start due date.

19. A system according to claim 18, wherein the second activity execution date is an earliest order finish date.

20. A system according to claim 12, wherein the first activity execution due date is an order finish due date.

21. A system according to claim 20, wherein the second activity execution date is a latest order start date.

* * * * *